(12) United States Patent
Huang et al.

(10) Patent No.: US 7,241,946 B2
(45) Date of Patent: Jul. 10, 2007

(54) METHOD AND DEVICE FOR MUSIC FORMAT SWITCHING

(75) Inventors: Hsing-Wei Huang, Banqiao (TW); Chun-Yen Liao, Dali (TW)

(73) Assignee: AsusTek Computer Inc., Taipei (TW)

( * ) Notice: Subject to any disclaimer, the term of this patent is extended or adjusted under 35 U.S.C. 154(b) by 286 days.

(21) Appl. No.: 11/002,138

(22) Filed: Dec. 3, 2004

(65) Prior Publication Data

US 2005/0150359 A1 Jul. 14, 2005

(30) Foreign Application Priority Data

Jan. 8, 2004 (TW) .............................. 93100420 A

(51) Int. Cl.
*G10H 7/00* (2006.01)
(52) U.S. Cl. .......................... 84/602; 84/609; 455/567
(58) Field of Classification Search ................. 84/602, 84/609, 611, 622; 455/567; 379/374.01, 379/373.02
See application file for complete search history.

(56) References Cited

U.S. PATENT DOCUMENTS

| | | | | |
|---|---|---|---|---|
| 4,217,805 A * | 8/1980 | Tamada | ........................ | 84/713 |
| 4,866,766 A * | 9/1989 | Mitzlaff | ................. | 379/373.02 |
| 5,099,513 A * | 3/1992 | Kim et al. | ............. | 379/374.01 |
| 5,153,829 A * | 10/1992 | Furuya et al. | ................. | 84/622 |
| 5,452,354 A * | 9/1995 | Kyronlahti et al. | .... | 379/373.02 |
| 5,598,461 A * | 1/1997 | Greenberg | ............... | 379/88.24 |
| 5,881,147 A * | 3/1999 | Kim | ....................... | 379/373.03 |
| 6,046,396 A * | 4/2000 | Miyamoto | .................... | 84/613 |
| 6,094,587 A * | 7/2000 | Armanto et al. | ............ | 455/567 |
| 6,308,086 B1 * | 10/2001 | Yoshino | ...................... | 455/567 |
| 6,366,791 B1 * | 4/2002 | Lin et al. | ..................... | 455/567 |
| 6,501,967 B1 * | 12/2002 | Makela et al. | .............. | 455/567 |
| 6,810,272 B2 * | 10/2004 | Kraft et al. | .................. | 455/566 |
| 6,831,220 B2 * | 12/2004 | Varme | ........................ | 84/483.2 |
| 7,058,428 B2 * | 6/2006 | Yamaki et al. | .............. | 455/567 |
| 2001/0024490 A1 * | 9/2001 | Oda | ......................... | 379/88.01 |
| 2002/0018556 A1 * | 2/2002 | Okazaki et al. | ......... | 379/373.02 |
| 2002/0052224 A1 * | 5/2002 | Yoon | ........................... | 455/567 |
| 2003/0016813 A1 * | 1/2003 | Weiner | ................... | 379/373.02 |
| 2003/0079598 A1 * | 5/2003 | Nakayama | .................... | 84/609 |
| 2003/0219110 A1 * | 11/2003 | Tsai et al. | .............. | 379/373.01 |
| 2003/0224767 A1 * | 12/2003 | Futamase et al. | ......... | 455/414.1 |
| 2004/0173082 A1 * | 9/2004 | Bancroft et al. | .............. | 84/612 |
| 2004/0242207 A1 * | 12/2004 | Chi | .......................... | 455/412.2 |
| 2006/0011044 A1 * | 1/2006 | Chew | ........................... | 84/609 |

FOREIGN PATENT DOCUMENTS

| | | |
|---|---|---|
| TW | 513884 | 12/2002 |
| TW | 569596 | 1/2004 |

* cited by examiner

*Primary Examiner*—Lincoln Donovan
*Assistant Examiner*—Christina Russell
(74) *Attorney, Agent, or Firm*—Rabin & Berdo PC

(57) ABSTRACT

A method and device for music format switching. A tone editor is first selected to compose ring tones in accordance with a first music format. It is determined whether a switch operation has been executed. If the switch operation has been executed, the ring tones are composed in accordance with a second music format.

9 Claims, 3 Drawing Sheets

METHOD AND DEVICE FOR MUSIC FORMAT SWITCHING

BACKGROUND

The invention relates to a method for data display, and in particular to a method for music format switching with respect to numerical notations and staves.

Ring tone composition is a popular function provided by mobile phones. Ring tones can be composed in accordance with numerical notations and staves. Numerical notation composition, however, is confusing for those unfamiliar with the relationship between numerical notations and staves. Staff composition is complicated for those with no musical background, and adds difficulty to composing ring tones. Additionally, ring tones in this music format cannot be used by most mobile phones.

Tone editors provided by a number of mobile phones compose ring tones in accordance with one music format, numerical notation or staves. Tone editors employing different music formats, however, cannot share ring tones with other tone editors. In addition, tone editors provided by the other mobile phones capable of composing ring tones with multiple formats cannot share ring tones with other mobile phones.

The described problems may result in inconvenience and difficulty in tone editing. Thus, a format switching method is desirable.

SUMMARY

Accordingly, embodiments of the invention provide a method for music format switching, enabling music format switching between numerical notations and staves.

Embodiments of the invention provide a method for music format switching. A tone editor is first selected for composing ring tones in accordance with a first music format. It is then determined whether a switch operation has been executed. If a switch operation has been executed, the ring tones are composed in accordance with a second music format.

A detailed description is given in the following embodiments with reference to the accompanying drawings.

BRIEF DESCRIPTION OF THE DRAWINGS

Embodiments of the invention can be more fully understood by reading the subsequent detailed description and examples with references made to the accompanying drawings, wherein.

DETAILED DESCRIPTION

Embodiments of the invention disclose a method and device for music format switching.

Figure 1:
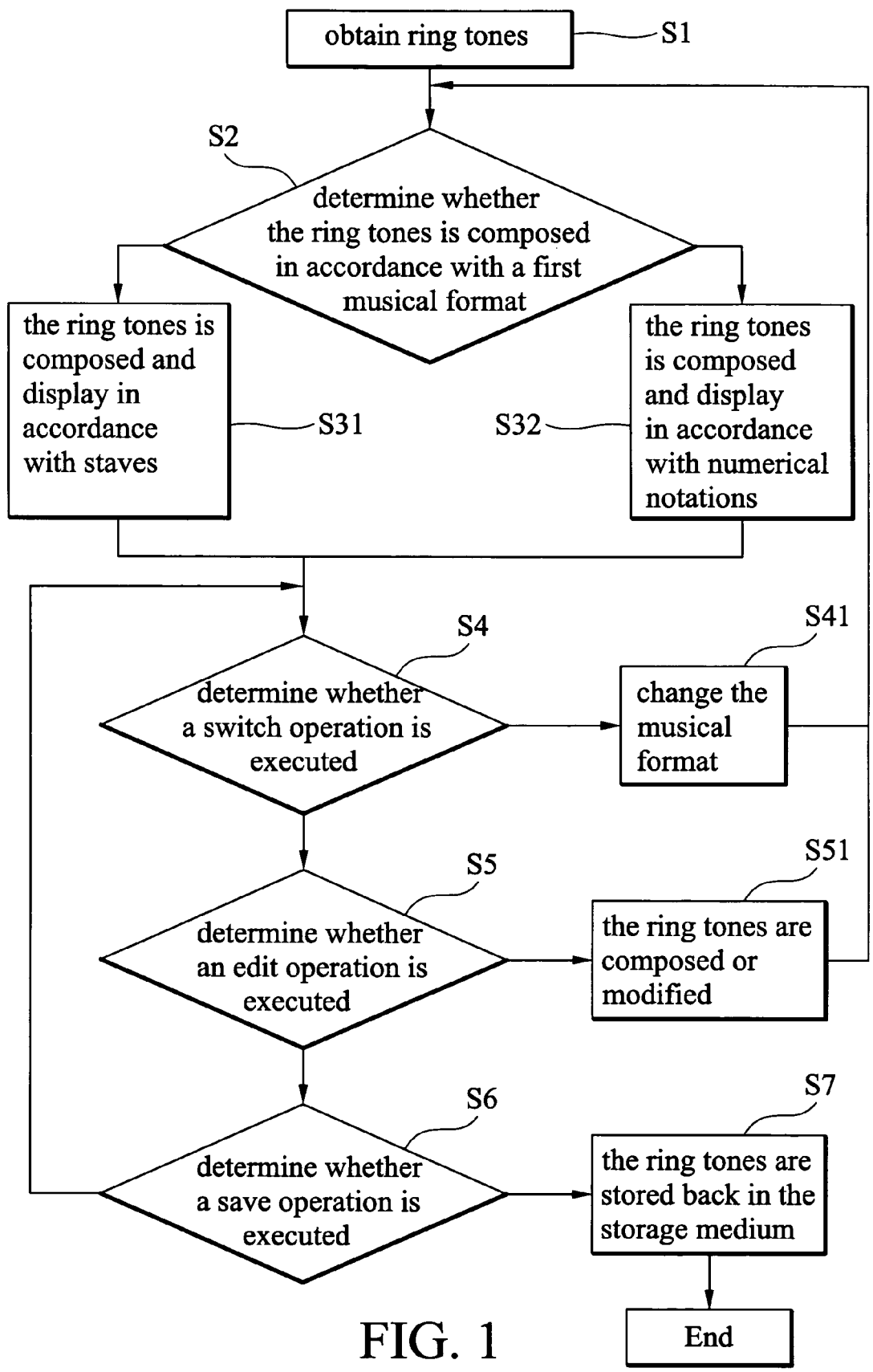
FIG. 1 is a flowchart of the method for music format switching according to an embodiment of the invention.

FIG. 1 is a flowchart of the method for music format switching according to an embodiment of the invention.

A tone editor of a mobile device is first selected and ring tones are obtained, analyzed, and stored in a storage medium, such as a flash memory, of the mobile device (Step S1). When the tone edit function has been executed, the ring tones are accessed, analyzed, and stored in a dynamic random access memory (DRAM). Next, it is determined whether the ring tones have composed in accordance with a first music format (staff format in this example) (Step S2). If so, the process proceeds to step S31, and, if not, to step S32.

When the default or previous music format is the first music format, the ring tones are composed, modified, and displayed in accordance with staves (Step S31). When the default or previous music format is the second music format, the ring tones are composed, modified, and display in accordance with numerical notations (Step S32). Next, it is determined whether a switch operation has been executed (Step S4). If so, the process proceeds to step S41, and, if not, to step S5. If the switch operation has been executed, the first music format switches to the second music format, or the second music format switches to the first music format (as shown in FIG. 2) (Step S41), and the process proceeds to step S2.

Thereafter, it is determined whether an edit operation has been executed (Step S5). If so, the process proceeds to step S51, and, if not, to step S6. If the edit operation has been executed, the ring tones are composed or modified (Step S51), and the process proceeds to step S2. In addition, during ring tone composition, it is further determined whether the switch operation has been executed. Next, it is determined whether a save operation has been executed (Step S6). If so, the process proceeds to step S7, and, if not, the process proceeds to step S4. Finally, the composed ring tones are again stored in the storage medium (Step S7).

Figure 2:
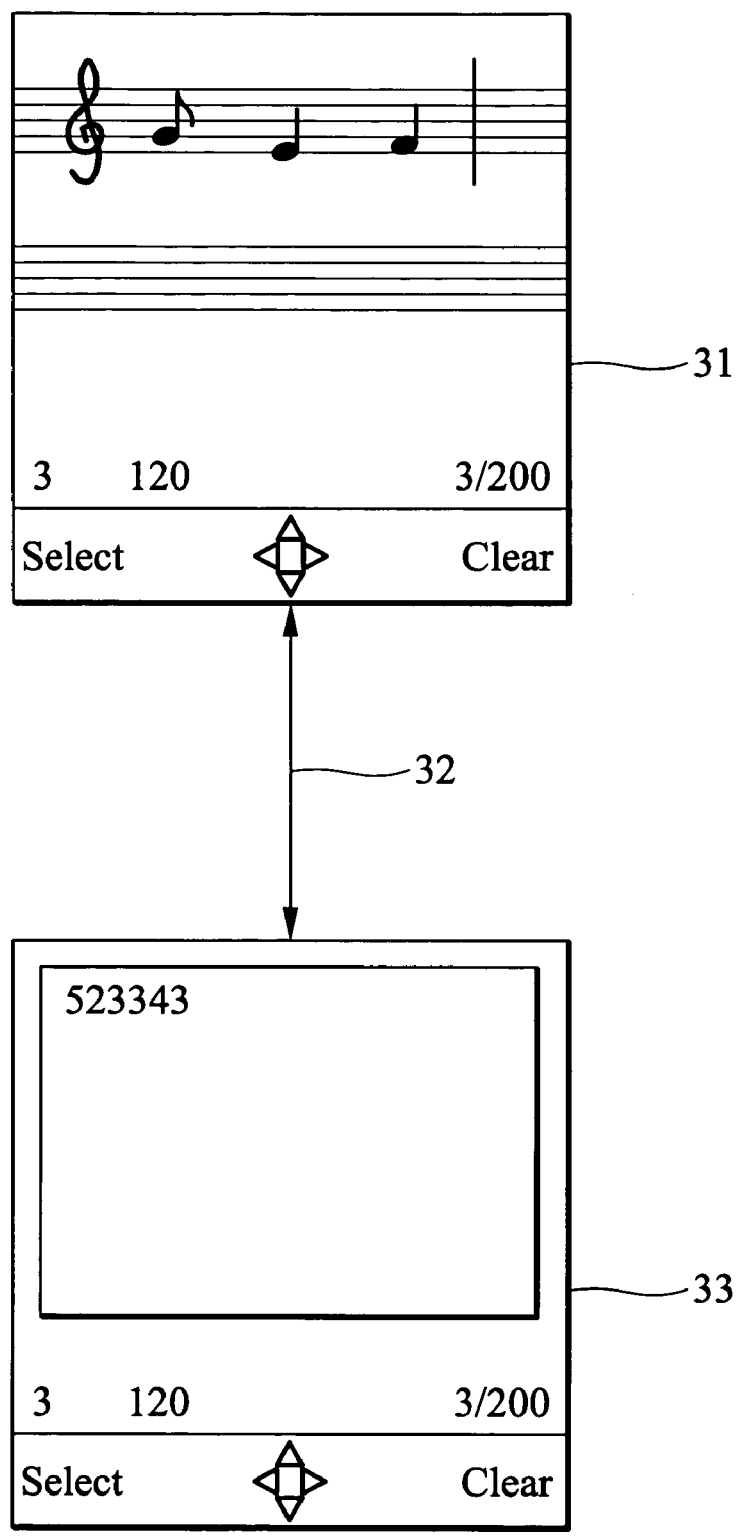
FIG. 2 is a schematic diagram of music format switching according to an embodiment of the invention.

FIG. 2 is a schematic diagram of music format switching according to an embodiment of the invention. When a switch operation 32 has been executed, the first music format (staves) 31 switches to the second music format (numerical notations) 33, or the second music format (numerical notations) 33 switches to the first music format (staves) 31.

Figure 3:
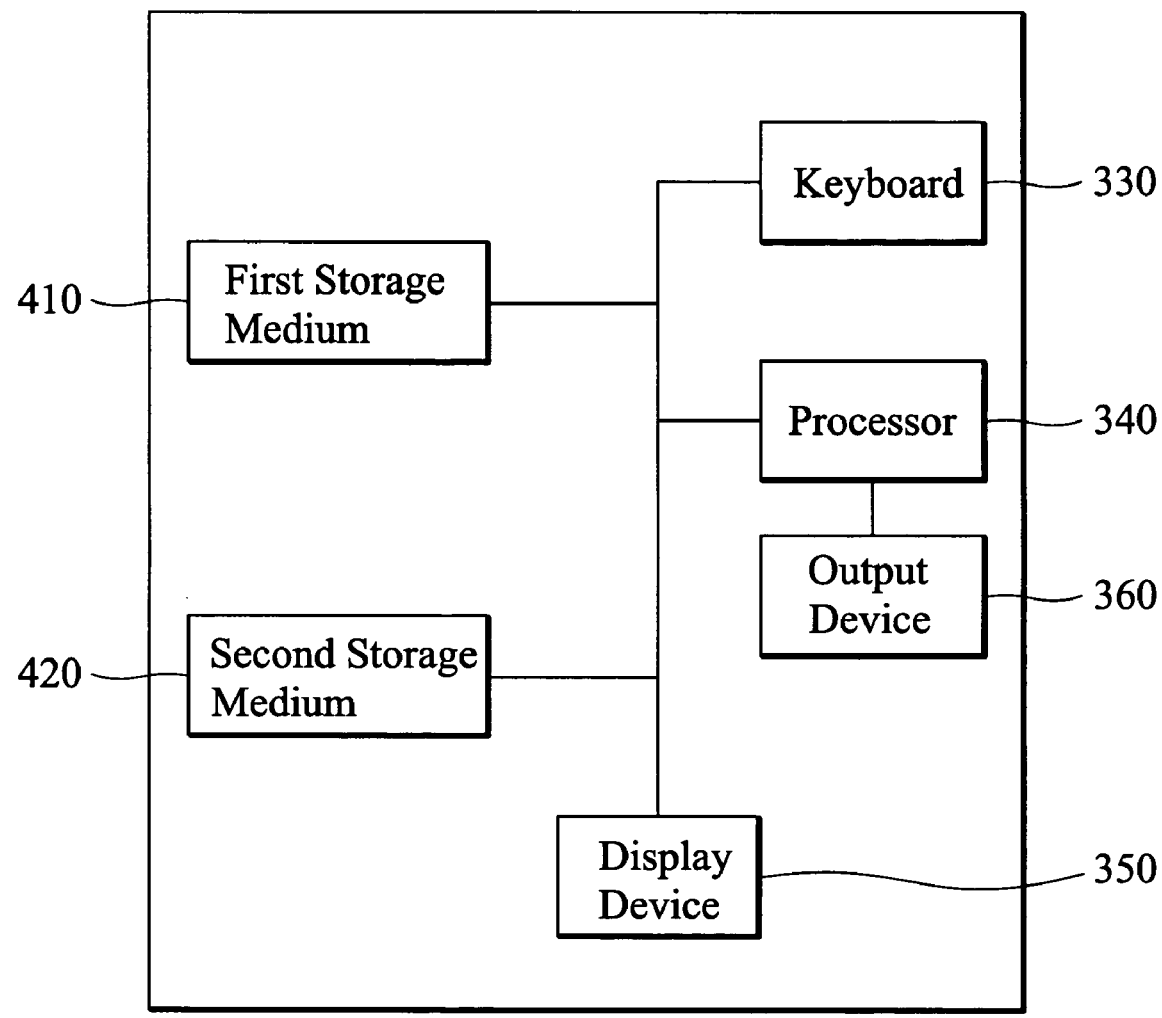
FIG. 3 is a schematic diagram of the architecture of the device for music format switching according to an embodiment of the invention.

FIG. 3 is a schematic diagram of the architecture of the device for music format switching according to an embodiment of the invention.

The architecture comprising a first storage medium 410, a second storage medium 420, a keyboard 330, a processor 340, a display device 350, and an output device 360. First storage medium 410, such as a random access memory (RAM), stores ring tones. Second storage medium 420, such as a flash memory, stores a program for music format switching and analysis of ring tone composition. Display device 350 displays the ring tones corresponding to a music format in a tone window, as shown in FIG. 2. Output device 360 outputs the composed ring tones.

Processor 340 executes the program for music format switching, analyzing the ring tones with a specific data format and then storing the analyzed ring tones in second storage medium 420. When the default or previous music format is a staff format, the ring tones are composed or modified in accordance with staves, displayed in the tone window. When processor 340 executes a switch operation, the staff format switches to a numerical notation format. When processor 340 executes an edit operation through keyboard 330, the ring tones are composed or modified in accordance with the current music format. After tone composition, processor 340 executes a save operation, storing the composed ring tones back in first storage medium 410.

Embodiments of the invention enable music format switching between numerical notations and staves, convenient and functional to compose and share ring tones.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for music format switching between systems of notation, applied to a ring tone process in a mobile device, comprising:
    selecting a tone editor to compose a melody of ring tones in accordance with a first music format employing a first system of notation;
    determining whether a switch operation has been executed;
    composing the melody in accordance with the first music format employing the first system of notation if the switch operation has not been executed; and
    composing the melody in accordance with a second music format employing a second system of notation if the switch operation has been executed.

2. The method as claimed in claim 1, wherein the melody is composed in accordance with a default music format when the switch operation has not been executed.

3. The method as claimed in claim 1, wherein the melody is composed in accordance with a previous music format when the switch operation has not been executed.

4. The method as claimed in claim 1, wherein during a next switch operation execution, the second music format switches to the first music format.

5. The method as claimed in claim 1, further determining whether an edit operation has been executed, and the melody is composed if the edit operation has been executed.

6. The method as claimed in claim 1, further determining whether the switch operation has been executed during composition of the melody.

7. A device for music format switching, comprising:
    a first storage medium, configured to store a melody of ring tones;
    a second storage medium, coupled to the first storage medium, storing a program;
    a processor, coupled to the first and second storage media, configured to execute a switch operation and to compose or modify said melody using the program; and
    a display device, coupled to the processor, configured to display the melody corresponding to a music format selected by said switch operation, wherein said music format comprises a system of music notation.

8. The device as claimed in claim 7, further comprising an input device, coupled to the processor, inputting the melody in accordance with the music format.

9. The device as claimed in claim 7, further comprising an output device, coupled to the processor, outputting the composed melody.

* * * * *